United States Patent [19]
Lentz

[11] Patent Number: 4,465,652
[45] Date of Patent: Aug. 14, 1984

[54] LAMINATED EXTRUSION DIE BLADE SUPPORT

[75] Inventor: William P. Lentz, Campbell, N.Y.

[73] Assignee: Corning Glass Works, Corning, N.Y.

[21] Appl. No.: 474,721

[22] Filed: Mar. 11, 1983

[51] Int. Cl.³ .............................................. B29F 3/00
[52] U.S. Cl. ........................... 264/177 R; 425/192 R; 425/463; 425/464
[58] Field of Search .................... 264/177 R; 425/463, 425/464, 192 R

[56] References Cited

U.S. PATENT DOCUMENTS

| | | |
|---|---|---|
| 3,479,692 | 11/1969 | van den Biggelaar .............. 425/464 |
| 3,632,279 | 1/1972 | Christy et al. ................... 425/192 R |
| 3,905,743 | 11/1975 | Bagley . |
| 3,923,444 | 12/1975 | Esper et al. . |
| 4,358,262 | 11/1982 | Herbert ........................... 425/192 R |
| 4,384,841 | 5/1983 | Yamamoto et al. ............ 264/177 R |

Primary Examiner—Donald E. Czaja
Assistant Examiner—Mary A. Becker
Attorney, Agent, or Firm—B. R. Turner

[57] ABSTRACT

Method and apparatus is set forth for supporting a laminated extrusion die in such a manner so as to virtually eliminate all tensile stress in the die by applying a compressive force to end portions of die blades, forming said laminated die, parallel to the neutral axis thereof and offset a given distance from the neutral axis toward an outlet face of the die.

12 Claims, 7 Drawing Figures

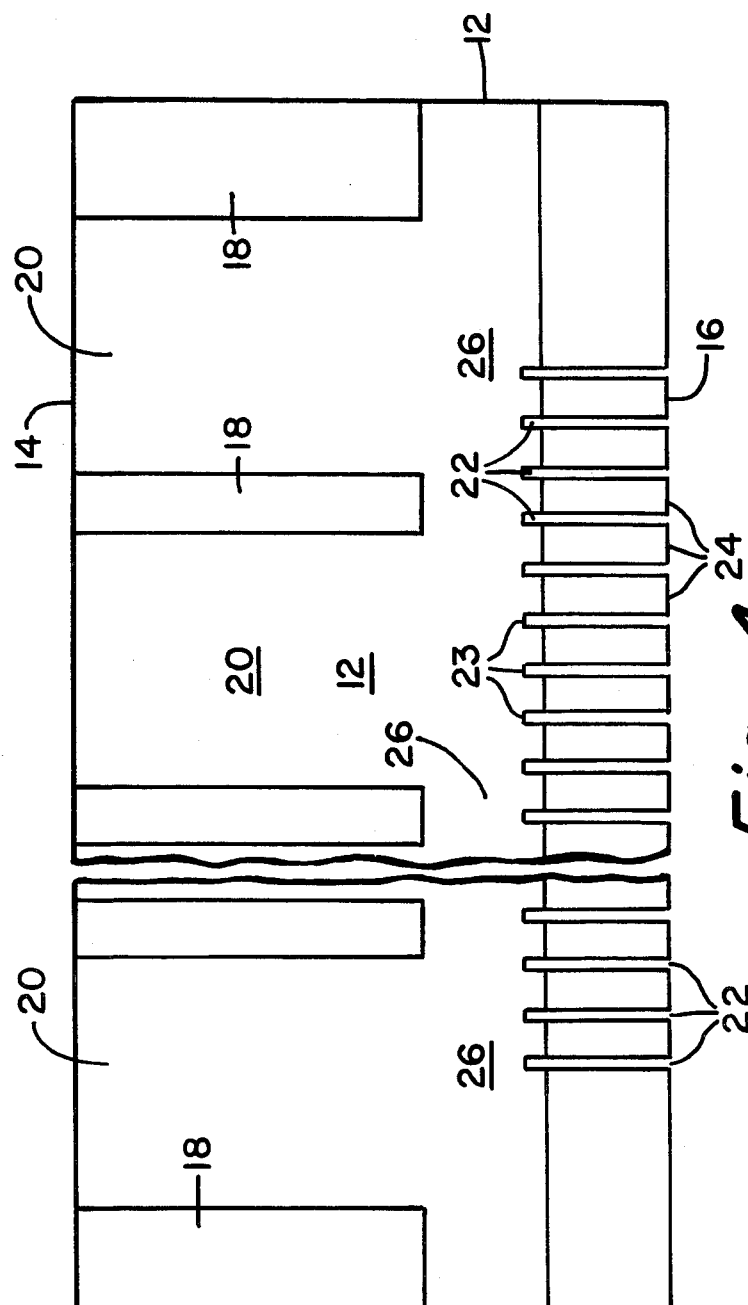
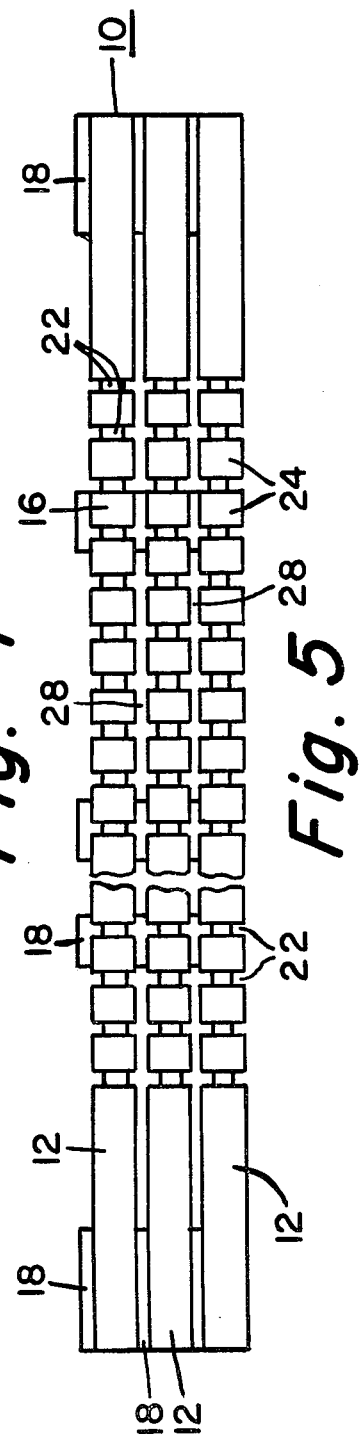

LAMINATED EXTRUSION DIE BLADE SUPPORT

BACKGROUND OF THE INVENTION

Extrusion dies have been found to be useful in forming cellular or honeycomb ceramic substrates for use in catalytic converters utilized in the exhaust system of internal combustion engines. In order for such converters to function efficiently, it is necessary that the cells provide a substantially large surface area for catalytic material to react with the exhaust gases, and that the cell walls have a substantially thin cross-sectional dimension so as to provide a substantially large open frontal area and thereby reduce back pressure within the exhaust system. However, the thin walled structure must have sufficient mechanical and thermal integrity so as to withstand normal automotive impact and thermal requirements.

The extrusion of such honeycomb ceramic substrates may be accomplished through the utilization of monolithic billet dies such as shown in FIGS. 1-6 of U.S. Pat. No. 3,905,743, wherein the die is formed in a unitary die block by utilizing conventional machining and cutting techniques, electric discharge machining, or chemical machining. Generally, unitary die blocks are formed of a malleable material which not only facilitates ease of machining the same, but also provides a degree of elasticity to accommodate stresses and bending moments generated centrally of the discharge face during the application of high extrusion pressures. However, a major disadvantage encountered with such dies resides in their limited useful lives due to their poor wear characteristics. That is, the abrasive nature of the ceramic batch material, which is extruded through such dies, has a tendency to materially abrade and wear away wall portions of the discharge slots to such an extent that the resulting substrate becomes out of tolerance and the die must be discarded.

As pointed out in FIGS. 7, 8 and 9 of U.S. Pat. No. 3,905,743, and as set forth in U.S. Pat. No. 3,923,444, extrusion dies for honeycomb ceramic substrates may be formed from a plurality of elongated extrusion plates which are clamped together in a stacked condition to form a laminated extrusion die. A major advantage which can be achieved in utilizing such laminated extrusion dies resides in the fact that each plate may be formed of an extremely hard wear-resistant material, and yet be relatively easily machined due to the thinness of each plate as compared to the vast expanse of a billet die. Even though excellent wear characteristics are obtained with the use of laminated extrusion dies having die blades formed from such wear-resistant refractory hard metals as tungsten carbide, such dies, being of extremely brittle material, have a tendency to break under the tensile stresses created in the outlet face when under extrusion pressures.

The present invention overcomes the breakage problems encountered with laminated dies formed of hard, brittle, wear-resistant refractory materials, such as tungsten carbide, by applying a compressive force to the ends of the refractory hard metal blades, which force is directed parallel to the neutral axis thereof so as to virtually eliminate all tensile stress in the blades. Although the use of compression for supporting various objects has been known, as shown in U.S. Pat. No. 3,591,411, a particular mode of application is set forth herein which provides improved structural die performance.

SUMMARY OF THE INVENTION

A laminated extrusion die is formed of a plurality of substantially parallel longitudinally-extending blades which are stacked and clamped together with adjacent faces in contact. A plurality of slots and grooves are formed in the faces of the individual die blades and in the outlet edge thereof for providing flow passages for batch material to be extruded. The blade assembly is clamped together with a small compressive force acting perpendicularly of the longitudinal extent of the die blades for the purpose of maintaining the blades in position as a unitary die.

In view of the fact that the outlet face of each of the die blades may be subjected to deleterious tensile stresses during the extrusion process, a compressive force is applied to the ends of the die blades and directed parallel to the neutral axis thereof so as to virtually eliminate all tensile stress in the blades. Preferably, a pressure wedge is urged to react against end portions of the die blades by means of a drive wedge urged into operable engagement with the pressure wedge in response to the pressure of the batch material flowing through an upstream portion of the die system.

Accordingly, it has been an object of the present invention to provide a novel die blade support for a laminated extrusion die to prevent breakage of such die by compensating for tensile stresses in the outlet face of the die.

BRIEF DESCRIPTION OF THE DRAWINGS

FIG. 4 is a side elevational view of a die blade.

FIG. 5 is a fragmental top plan view of an extrusion die illustrating the parallel arrangement of a plurality of three die blades.

DESCRIPTION OF THE PREFERRED EMBODIMENTS

Figure 1:
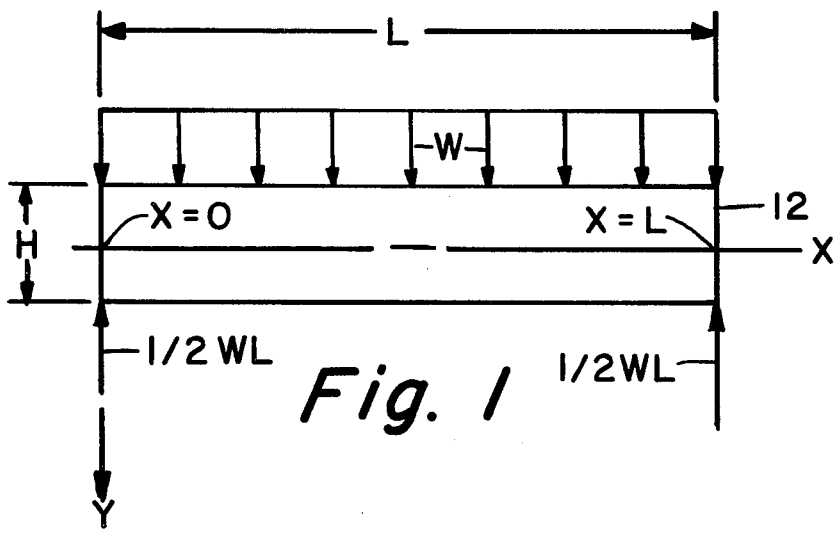
FIG. 1 is a schematic elevational view of a die blade illustrating the normal loading of the same during extrusion operations.

Initially referring to FIGS. 3-6, a laminated extrusion die 10 is shown comprising a plurality of extrusion plates or die blades 12 which may be suitably clamped or fused together to form the laminated die. The die 10 has an inlet face 14 and a discharge or outlet face 16. Each of the die blades 12, forming the extrusion die 10, has a plurality of ribs or channel dividers 18 extending longitudinally of the flow path through the die from the inlet face 14 toward the outlet face 16, and terminating immediate such faces to form a plurality of feed channels 20 therebetween. The discharge or outlet face 16 of each of the die blades 12 is provided with a plurality of transverse discharge slots 22 extending thereacross, and inwardly of the die blade from the outlet face 16 toward the inlet face 14. The transverse slots 22 terminate in root portions 23 inwardly of outlet face 16 and form a plurality of teeth or core pins 24 therebetween. A flow distribution area 26 is formed between the inner ends of the feed channels 20 and the inner ends or roots 23 of the transverse discharge slots 22 of each die blade 12, and thus the channels 20 and slots 22 are in communication with each other through the flow distribution area 26.

Figure 6:
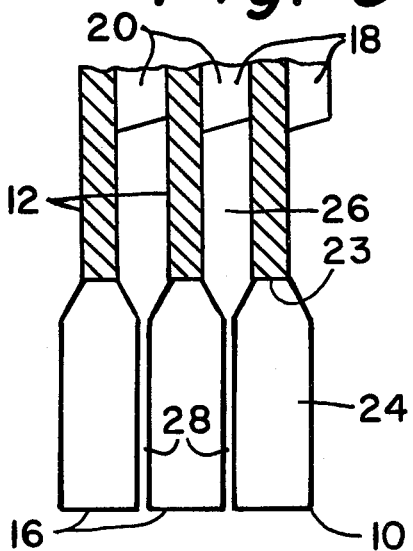
FIG. 6 is a fragmental sectional view in elevation of the discharge portion of the extrusion die shown in FIG. 5.

As shown more particularly in FIGS. 5 and 6, when the individual die blades 12 are stacked together to form a laminated die 10, the plane between each adjacent extrusion plate or die blade 12 forms a longitudinal discharge slot 28 between the teeth or core pins 24 formed in such adjacent die blades. Thus, the longitudinal discharge slots 28 in cooperation with the transverse discharge slots 22 provide a gridwork of interconnected discharge slots in the outlet face 16.

When the individual extension plates or die blades 12 are stacked together in parallel relationship as shown in FIG. 5 to form a laminated extrusion die 10, side edge portions of the blades are of course sealed and the blades clamped or bonded together to form a unitary die. In operation, batch material enters the inlet face 14 and flows through the die, filling all of the discharge slots 22, 28 prior to being discharged from the outlet face 16, to form a cellular or honeycomb extruded substrate.

Referring now to FIG. 1, a schematic illustration of a die blade 12 is shown in a normal loaded condition, such as would be experienced when the extrusion die 10 is subjected to extrusion pressures. That is, each die blade 12 is loaded substantially like a simply supported beam under a uniformly distributed load along its length. The magnitude of the distributed load W is the product of the pressure drop through the die, and the pitch of the blades as determined by the total thickness C of the blade 12 including the rib 18 (see FIG. 3). The reaction forces exerted by the supporting structure (which may be a die mask 30 shown in FIG. 7) on the ends of each blade are ½ WL, wherein L is the length of the blade between the support points, such as provided by the mask 30. Such a loading of the die blade 12 produces a bending moment distribution $M_p$ defined by the equation:

$$M_p = \tfrac{1}{2} WX(L-X) \tag{a}$$

wherein X is the distance along the neutral axis of the die blade 12, and accordingly the bending moment $M_p$ varies from 0 at the support points (X=0, X=L) to a maximum of $\tfrac{1}{8} WL^2$ at the midpoint of the span where X=L/2. The bending moment, in turn, produces a longitudinal stress distribution $S_P$ given by the formula:

$$S_P = \frac{MY}{I} = \frac{WY}{2I} X(L-X) \tag{b}$$

wherein Y is a distance in a positive direction below the neutral axis, and I is the moment of inertia of the blade cross-section. Such stress distribution $S_P$ has its maximum tensile value near the root 23 of the transverse discharge slots 22 formed in the outlet face 16 of the die blades 12, and has a tendency to cause failure in such blades, particularly when made from brittle refractory hard metal materials such as tungsten carbide.

Figure 2:
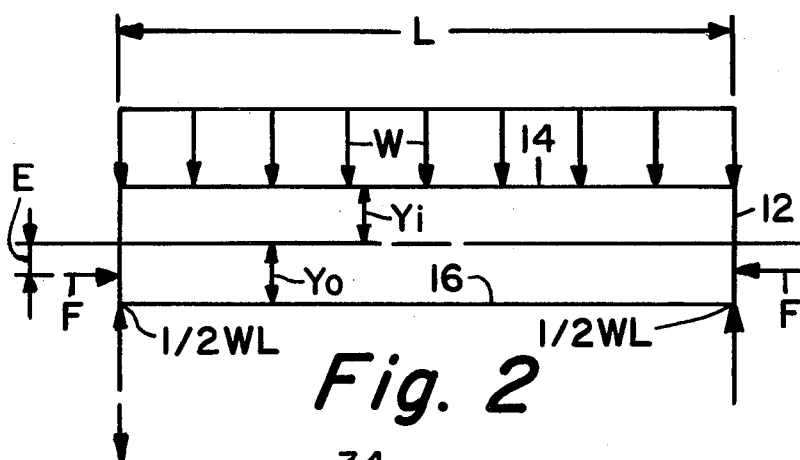
FIG. 2 is a schematic elevational view of a die blade illustrating the use of a compressive force, parallel to and offset from the neutral axis of the blade, for eliminating tensile stress normally generated in the outlet face of the blade.

Referring now to FIG. 2, a compressive force F is shown as being applied to the die blade 12 at a distance E below, and in a positive Y-direction from, the neutral axis X. That is, the force F is applied to the die blade 12 between the neutral axis X and the outlet face 16. The applied force F produces a bending moment $M_F$, in the sense that it is opposite to that produced by the pressure drop; or in other words, $M_F = -FE$. Such compressive force F also produces a longitudinal compressive stress of magnitude F/A where A is the area of the blade cross-section. Thus, the total stress $S_F$ produced by the force F is:

$$S_F = \frac{M_F Y}{I} - \frac{F}{A} = -F\left(\frac{EY}{I} + \frac{1}{A}\right) \tag{0}$$

The net stress distribution $S_N$ in the blade 12 is the sum of stress distribution $S_P$ and the total stress $S_F$ produced by the force F, or equation (b)+equation (0):

$$S_N = \frac{WY}{2I} X(L-X) - F\left(\frac{EY}{I} + \frac{1}{A}\right) \tag{1}$$

If $Y_i$ and $Y_o$ are the distances from the neutral axis X to the inlet face 14 and outlet face 16, respectively, and where E and F have the following values:

$$E = \frac{I}{A Y_i} \tag{2}$$

$$F = \frac{WL^2 A Y_o Y_i}{8I(Y_o + Y_i)} \tag{3}$$

the longitudinal stress in blade 12 will be everywhere along its extent less than or equal to 0, such that the blade will be in compression. Substituting the expressions of equations (2) and (3) into equation (1) and rearranging the result yields:

$$S_N = \frac{WL^2}{8I} Y_o \left[4\frac{X}{L}\left(1 - \frac{X}{L}\right)\frac{Y}{Y_o} - \frac{Y_i + Y}{Y_i + Y_o}\right] \tag{4}$$

The stress $S_{Ni}$ at the inlet face 14 and the stress $S_{No}$ at the outlet face 16 of the die blade 12 are found by substituting $-Y_i$ and $Y_o$ for Y, producing the following:

$$S_{Ni} = \frac{-WL^2}{8I}\left[4\frac{X}{L}\left(1 - \frac{X}{L}\right)\right] Y_i \tag{5}$$

$$S_{No} = \frac{-WL^2}{8I}\left[1 - 4\frac{X}{L}\left(1 - \frac{X}{L}\right)\right] Y_o \tag{6}$$

By inspection, it can be seen that both the stress at the inlet face $S_{Ni}$ and the stress at the outlet face $S_{No}$ are less than or equal to 0 for all values of X between 0 and L. Further, the stress distribution can be written in terms of $S_{Ni}$ and $S_{No}$ by eliminating the quantities $$\frac{WL^2}{8I} \text{ and } 4\frac{X}{L}\left(1 - \frac{X}{L}\right)$$

between equations 4 through 8, thus giving:

$$S_N = S_{Ni}\left(\frac{Y_o - Y}{Y_o + Y_i}\right) + S_{No}\left(\frac{Y + Y_i}{Y_o + Y_i}\right) \quad (7)$$

The two quantities in parentheses are always positive for values of Y between $-Y_i$ and $Y_o$. Thus, the net stress, everywhere along the longitudinal extent of the die blade 12, is the sum of 2 negative or zero quantities, and is therefore itself always negative or zero.

Figure 3:
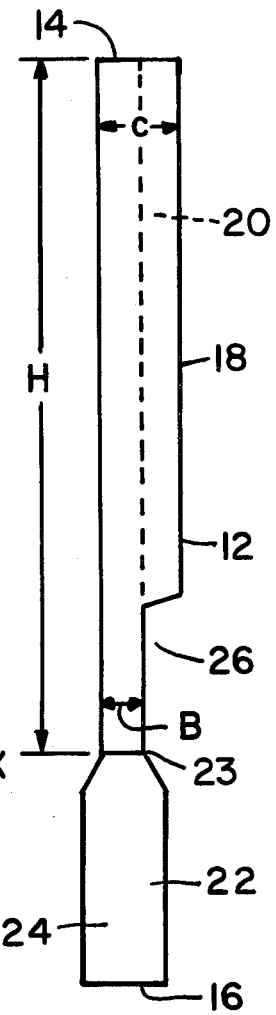
FIG. 3 is an end elevational view of a typical die blade.

Referring to FIG. 4, it is seen that if the teeth or core pins 24 on the outlet face 16 and the spacer ribs or channel dividers 18 on the face of the die blade 12 are ignored (which they have been for the foregoing calculations), the cross-section of the blade is essentially a rectangle having an effective beam height H (measured between inlet face 14 and root portions 23) and a width B, which does not include rib 18 (see FIG. 3). Accordingly, the following relationships exist:

$$A = BH \quad (8)$$

$$I = \frac{BH^3}{12} \quad (9)$$

$$Y_o = Y_i = \frac{H}{2} \quad (10)$$

Substituting expressions 8, 9, and 10 into equations 2, 3, 5, 6 and 7 provides the following:

$$E = \frac{H}{6} \quad (11)$$

$$F = \frac{3WL^2}{8H} \quad (12)$$

$$S_{Ni} = S_{MIN}\left[4\frac{X}{L}\left(1 - \frac{X}{L}\right)\right] \quad (13)$$

$$S_{No} = S_{MIN}\left[1 - 4\frac{X}{L}\left(1 - \frac{X}{L}\right)\right] = S_{MIN} - S_{Ni} \quad (14)$$

$$S_N = S_{Ni}\left(\frac{1}{2} - \frac{Y}{H}\right) + S_{No}\left(\frac{Y}{H} + \frac{1}{2}\right) \quad (15)$$

wherein the minimum stress $S_{MIN}$ that occurs in the blade 12 is given by the following:

$$S_{MIN} = -\frac{3WL^2}{4BH^2} = -\frac{2F}{A} \quad (16)$$

The minimum stress occurs at the support points indicated as ½ WL at the ends of the outlet face 16 which would be provided by the mask 30, and the midpoint on the inlet face 14. The maximum stress is zero and occurs at the outer edges of the inlet face 14 and the midpoint of the outlet face 16 of FIG. 2 wherein the teeth are ignored.

As a specific example, if a die 10 were formed from a plurality of die blades 12 such as shown in FIG. 4, and such blades had a height of 1.35" between inlet face 14 and root portions 23 (H=1.35"), a width of 0.024" (B=0.024"), a length of 4" (L=4"), and a pitch of 0.053" (C=0.053"), then the load per unit length for an assumed pressure drop of 1000 psi is 53 lbs./in. (W=53 lbs./in.). Thus, utilizing the foregoing values provides the following results:

E=0.225 in.
F=236 lb.
$S_{MIN}$= −14,540 psi

It will be appreciated that the latter two numbers must be multiplied by the actual pressure drop in thousands of pounds per square inch, to obtain the actual end force and minimum stress.

Figure 7:
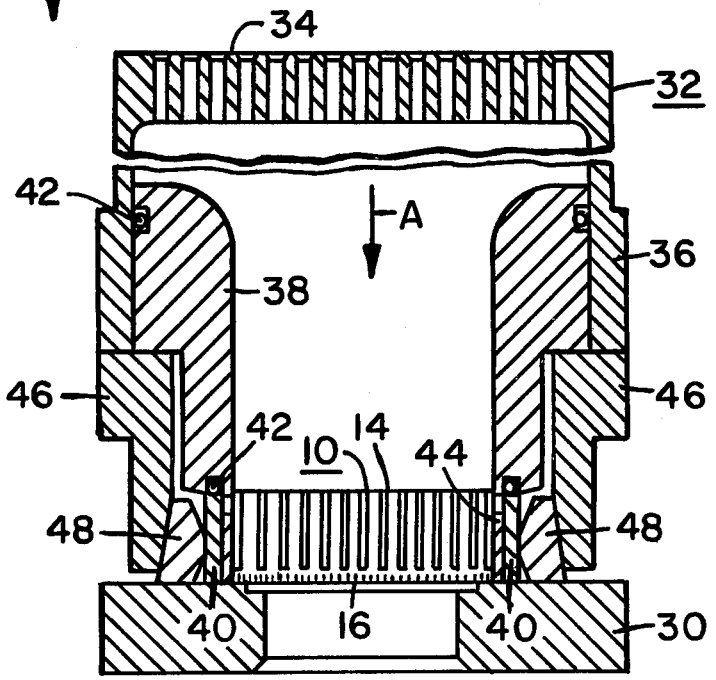
FIG. 7 is a fragmental elevational view in section of the discharge end of an extruder incorporating the present invention.

Although the end force F may be supplied by any suitable means such as by a hydraulic cylinder or jack bolts, a preferred embodiment for applying such force is illustrated more specifically in FIG. 7. FIG. 7 is a somewhat schematic illustration of a discharge end of an extrusion system, but without illustrating the cylinder per se or the end support structure. A homogenizer 32 is positioned within the cylinder upstream of the die and includes a perforated disc portion 34 for homogenizing the batch material and a cylindrical base or foot portion 36. A somewhat cylindrical flow deflector or transition member 38 is positioned internally of the homogenizer 32 and has an outer end portion abutting a compression spacer 40 mounted externally of the ends of die blades 12 forming laminated extrusion die 10. Suitable O-rings 42 seal the flow deflector 38 with respect to the homogenizer 32 and the spacers 40. A shim 44 of softer material may be positioned between the compression spacer 40 and the laminated die 10 on each side of the die adjacent the ends of the die blades 12, to accommodate any unevenness in the blade assembly.

The cylindrical base or foot portion 36 of the homogenizer 32 is in operable engagement with an inner surface of a drive wedge 46, the outer end of which is spaced apart from the retaining mask 30. The drive wedge 46 engages a pressure wedge 48 urging the same into compressive contact with compression spacers 40.

In operation, when the system is extruding batch material through the homogenizer 32 and die 10, a pressure drop experienced across the perforated disc portion 34 provides a force parallel to the direction of flow indicated by arrow A. The force, exerted longitudinally of the batch flow by the cylindrical base portion 36 upon the drive wedge members 46, urges the drive wedge members longitudinally outwardly toward the discharge mask 30 within the provided space, and converts such longitudinal force into the required end force F via the pressure wedges 48 and compression spacers 40 which act upon the ends of the die blades 12 through compensating shims 44. The wedge angle is, of course, chosen so as to amplify the longitudinal force exerted by the homogenizer, so as to provide the required total end force necessary for all of the die blades 12 comprising the laminated die 10.

Although I have disclosed the preferred embodiments of my invention, it will be apparent to those skilled in the art that various changes and modifications may be made thereto without departing from the spirit and scope of the invention as defined in the appended claims.

I claim:

1. A support for a laminated extrusion die having an inlet face and an outlet face and composed of a plurality of longitudinally extending die blades stacked in parallel relationship with said die blades each having opposed end portions with a neutral longitudinal axis extending therethrough, said support comprising means for applying a compressive end force to the opposed end portions of said die blades at a predetermined distance from said neutral axis toward the outlet face of said die to minimize tensile stresses generated in the die blades when subjected to extrusion pressures.

2. A support for a laminated die as defined in claim 1 wherein said predetermined distance from said neutral axis is substantially equal to 1/6 the height of said die blades as measured between said inlet face and root portions of discharge slots formed in said outlet face perpendicularly of said neutral axis.

3. A support for a laminated die as defined in claim 1 wherein said compressive end force, F, is defined by the following equation:

$$F = \frac{3WL^2}{8H}$$

wherein W is the distributed load per unit length experienced by each die blade when subjected to an extrusion force, L is the length of the die blade between its supported end portions, and H is the effective beam height of the die blade.

4. A support for a laminated die as defined in claim 1 wherein said means for applying a compressive end force includes pressure wedge means for applying the compressive end force to end portions of said die blades, drive wedge means moveable transversely of said neutral axis for urging said pressure wedge means toward the ends of said die blades for exerting said force thereon, and means responsive to generated extrusion pressures for urging said drive wedge means transversely of said neutral axis toward the outlet face of said die.

5. A laminated extrusion die structure comprising, a plurality of longitudinally-extending die blades having opposed faces, said plurality of die blades being stacked together in parallel relationship with adjacent faces juxtapositioned, each of said die blades having end support portions at opposed longitudinal ends and an inlet face and an outlet face, a neutral axis extending longitudinally along each of said die blades intermediate said inlet and outlet faces and intersecting said end portions, means for applying a compressive force to the ends of said die blades and directed parallel to said neutral axis, said means applying said compressive force at a predetermined distance from said neutral axis and between said neutral axis and said outlet face, and said means for applying a compressive force including wedge means responsive to forces generated during extrusion for eliminating all tensile stress within the die blades normally generated by the extrusion forces.

6. A laminated extrusion die structure as defined in claim 5 wherein said wedge means includes pressure wedge means for applying the compressive end force to the ends of said die blades parallel to said neutral axis, and drive wedge means moveable parallel to the direction of flow through said die for operatively engaging said pressure wedge means for controlling the amount of compressive force applied to the ends of said die blades.

7. A laminated extrusion die structure as defined in claim 6, wherein said wedge means further includes homogenizer means positioned upstream of said drive wedge means, relative to the flow through said die, for providing a force parallel to the direction of such flow responsive to the pressure drop created by such flow across said homogenizer means, and for exerting such parallel force on said drive wedge means and moving said drive wedge means into operable engagement with said pressure wedge means, and said pressure wedge means converting said force parallel to the direction of flow to the required end force applied to said die blades.

8. A laminated extrusion die structure as defined in claim 6 wherein said wedge means includes compression spacer means positioned between said pressure wedge means and end portions of said die blades forming said laminated die for transferring the end force exerted by said pressure wedge means to said die blades at the predetermined location from said neutral axis.

9. A laminated extrusion die structure as defined in claim 5 wherein said predetermined distance from said neutral axis is substantially equal to 1/6 of the height of the die blade as defined by the distance between said inlet face and root portions of discharge slots formed in said outlet face measured perpendicularly to said neutral axis.

10. A laminated extrusion die structure as defined in claim 5 wherein said compressive force, F, applied to the ends of said die blades is equal to:

$$F = \frac{3WL^2}{8H}$$

wherein W is the magnitude of the distributed load per unit length on each laminated die blade responsive to the forces generated during extrusion, L is the length of the die blade between said opposed longitudinal ends, and H is the effective beam height of the die blade as measured perpendicularly to said neutral axis.

11. A method of supporting a laminated extrusion die, having an inlet face and an outlet face and composed of a plurality of longitudinally-extending die blades stacked together in parallel relationship with said die blades each having opposed end portions with a neutral longitudinal axis extending therethrough, in such a manner so as to eliminate substantially all tensile stress within the laminated die normally generated by extrusion forces which comprises, applying a compressive end force to the opposed end portions of said die blades, directing said force parallel to said neutral axis, and applying said compressive end force at a predetermined distance toward said outlet face from said neutral axis to thereby eliminate substantially all tensile stress in said blades forming said die normally generated in the die blades when subjected to extrusion forces.

12. A method of supporting a laminated extrusion die as defined in claim 11 including the steps of providing a force parallel to the flow through said laminated die responsive to extrusion generated forces, and converting said parallel force to said required end force parallel to said neutral axis.

* * * * *